US008793423B2

(12) United States Patent
Zheng

(10) Patent No.: US 8,793,423 B2
(45) Date of Patent: Jul. 29, 2014

(54) SERVICING INTERRUPT REQUESTS IN A COMPUTER SYSTEM

(75) Inventor: Xiao Gang Zheng, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 142 days.

(21) Appl. No.: 13/432,178

(22) Filed: Mar. 28, 2012

(65) Prior Publication Data

US 2013/0262726 A1  Oct. 3, 2013

(51) Int. Cl.
G06F 13/24 (2006.01)
G06F 13/32 (2006.01)
G06F 13/26 (2006.01)

(52) U.S. Cl.
CPC ........................................ G06F 13/26 (2013.01)
USPC ............................ 710/264; 710/268; 710/265

(58) Field of Classification Search
USPC ................................................. 710/260–269
See application file for complete search history.

(56) References Cited

U.S. PATENT DOCUMENTS

| 5,850,521 | A | * | 12/1998 | Morganti et al. | 709/208 |
|---|---|---|---|---|---|
| 6,275,749 | B1 | * | 8/2001 | Saville et al. | 700/292 |
| 6,941,398 | B2 | | 9/2005 | Lai et al. | |
| 7,257,658 | B2 | | 8/2007 | Winkler et al. | |
| 7,805,557 | B2 | * | 9/2010 | Kimelman et al. | 710/264 |
| 8,214,574 | B2 | * | 7/2012 | Chinya et al. | 710/269 |
| 2006/0161921 | A1 | * | 7/2006 | Kissell | 718/102 |
| 2008/0109564 | A1 | | 5/2008 | Arndt et al. | |

* cited by examiner

Primary Examiner — Raymond Phan
(74) Attorney, Agent, or Firm — Park, Vaughan, Fleming & Dowler, LLP

(57) ABSTRACT

Methods and apparatuses are provided for servicing an interrupt in a computer system. The method includes a device driver receiving an interrupt request. The device driver is responsive to the interrupt request to store interrupt data in a portion of the memory. The interrupt data includes identification of at least one processor of the plurality of processors capable of servicing the interrupt request; priority of the interrupt request; a thread context; and an address for instructions to service the interrupt request. The device driver then instructs the peripheral device to issue a memory write to the plurality of processors so that each may determine if it can use the thread context and the instructions to service the interrupt. A computer system is provided with the hardware needed to perform the method.

20 Claims, 4 Drawing Sheets

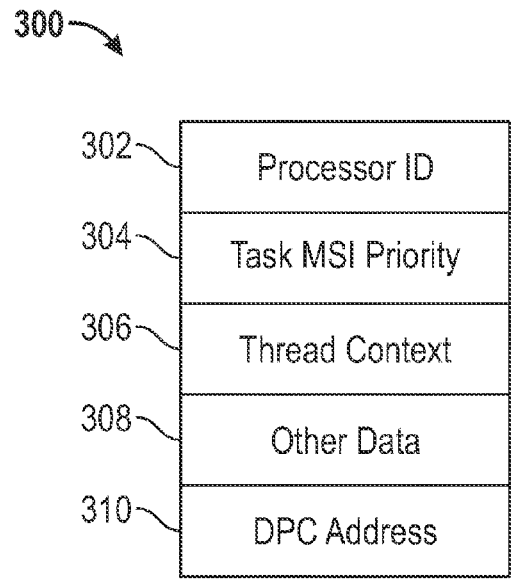
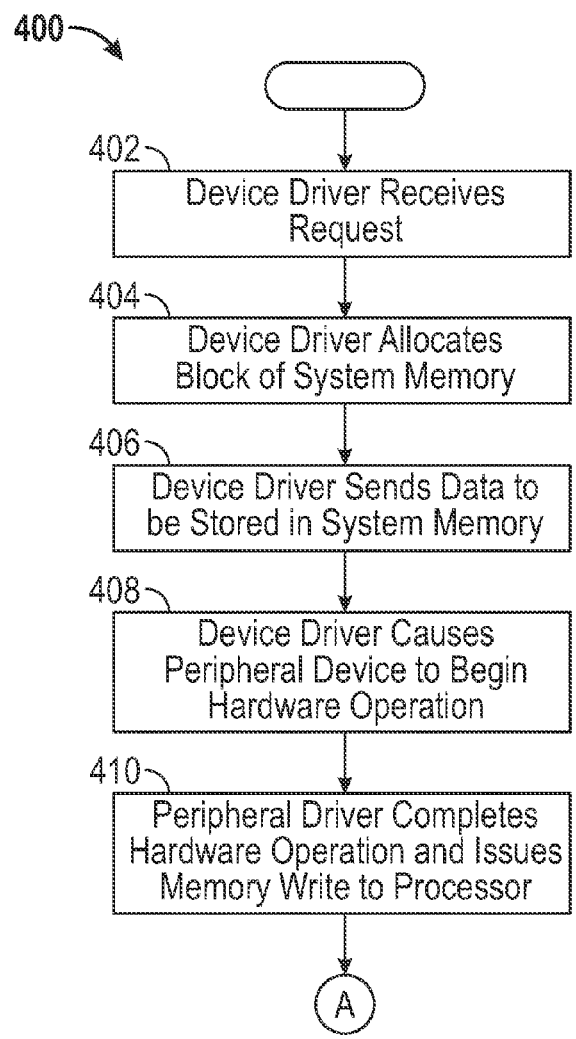

SERVICING INTERRUPT REQUESTS IN A COMPUTER SYSTEM

TECHNICAL FIELD

The technical field relates to computer systems, processors and corresponding operation methods, and in particular to techniques for processing message signaled interrupts for a processor.

BACKGROUND

Interrupt techniques are frequently used in many existing computer system technologies. Generally, an interrupt can be described as an asynchronous event that suspends normal processing and temporarily diverts processor control to process (or handle) the interrupt. Many contemporary computer systems employ a message signaled interrupt (MSI) process or an input-output advanced programmable interrupt controller (IO APIC). Message signaled interrupts are a type of edge triggered interrupt (as opposed to level triggered interrupts) and can be viewed as a discrete interrupting event. A conventional technique for dealing with MSIs is specified in the Advanced Programmable Interrupt Controller (APIC) standard. This standard is used primarily in multiprocessor systems and supports interrupt redirection and interrupt transmission between processors.

In conventional APIC techniques, the processor being interrupted responds to an interrupt by storing information about the current state of the running program and invoking a first-level interrupt handler (commonly referred to as an Interrupt Service Routine (ISR)). The ISR may then call another interrupt handler associated with the particular device that generated the interrupt (i.e., a device driver for the particular device) to discover the cause of the interrupt. In the case of a shared interrupt, the device driver of the device normally reads the device interrupt status to identify whether it should claim (service) the interrupt. If the device is the source of the interrupt, the device driver performs certain critical tasks to minimize interrupt handling time, and then schedules a deferred procedure call (DPC), which represents the instructions necessary to actually service the interrupt. The device driver next sets a flag to tell the ISR that its device is the owner of (claims) the interrupt. If the device driver doesn't claim the interrupt, the device driver exits without setting the flag and the ISR continues to call the interrupt routine of other device drivers to service the interrupt.

However, the communication necessary to identify the device that has generated the interrupt may produce interrupt handling latencies. That is, the various communication paths between the ISR, device driver(s) and the DPC may be extensive. This is particularly apparent where interrupts are shared by multiple devices since the device drivers need to be successively activated. As a consequence the operating speed of the computer system may be significantly affected.

BRIEF SUMMARY OF EMBODIMENTS OF THE INVENTION

A computer system is provided for that is capable of servicing interrupt requests. The computer system includes an interconnect that operably couples a memory, a plurality of processors and one or more peripheral devices. A device driver associated with each of the one or more peripheral devices is stored in the memory and is responsive to an interrupt request to store in the memory: identification of at least one processor of the plurality of processors capable of servicing the interrupt request; priority of the interrupt request; a thread context; and an address for instructions to service the interrupt request. The device driver is capable of causing the associated peripheral device to issue a memory write to the plurality of processors so each can determine if it may switch to the thread context and process the instructions to service the interrupt request.

A method is provided for servicing an interrupt in a computer system having a memory and a plurality of processors coupled to one or more peripheral devices. The method includes a device driver receiving an request and preparing interrupt data for storage in a portion of the memory allocated for storing interrupt data. The interrupt data includes identification of at least one processor of the plurality of processors capable of servicing the interrupt request; priority of the interrupt request; a thread context; and an address for instructions to service the interrupt request. The device driver then instructs the peripheral device to issue a memory write to the plurality of processors so that each may determined if it can use the thread context and the instructions to service the interrupt.

BRIEF DESCRIPTION OF THE DRAWINGS

Embodiments of the present disclosure will hereinafter be described in conjunction with the following drawing figures, wherein like numerals denote like elements.

FIG. 3 is an illustration for the Task MSI data format according to exemplary embodiments of the present disclosure; and FIGS. 4-5 are a flow diagram illustrating an exemplary method for handling message signaled interrupts according to exemplary embodiments of the present disclosure.

DETAILED DESCRIPTION

Figure 1:
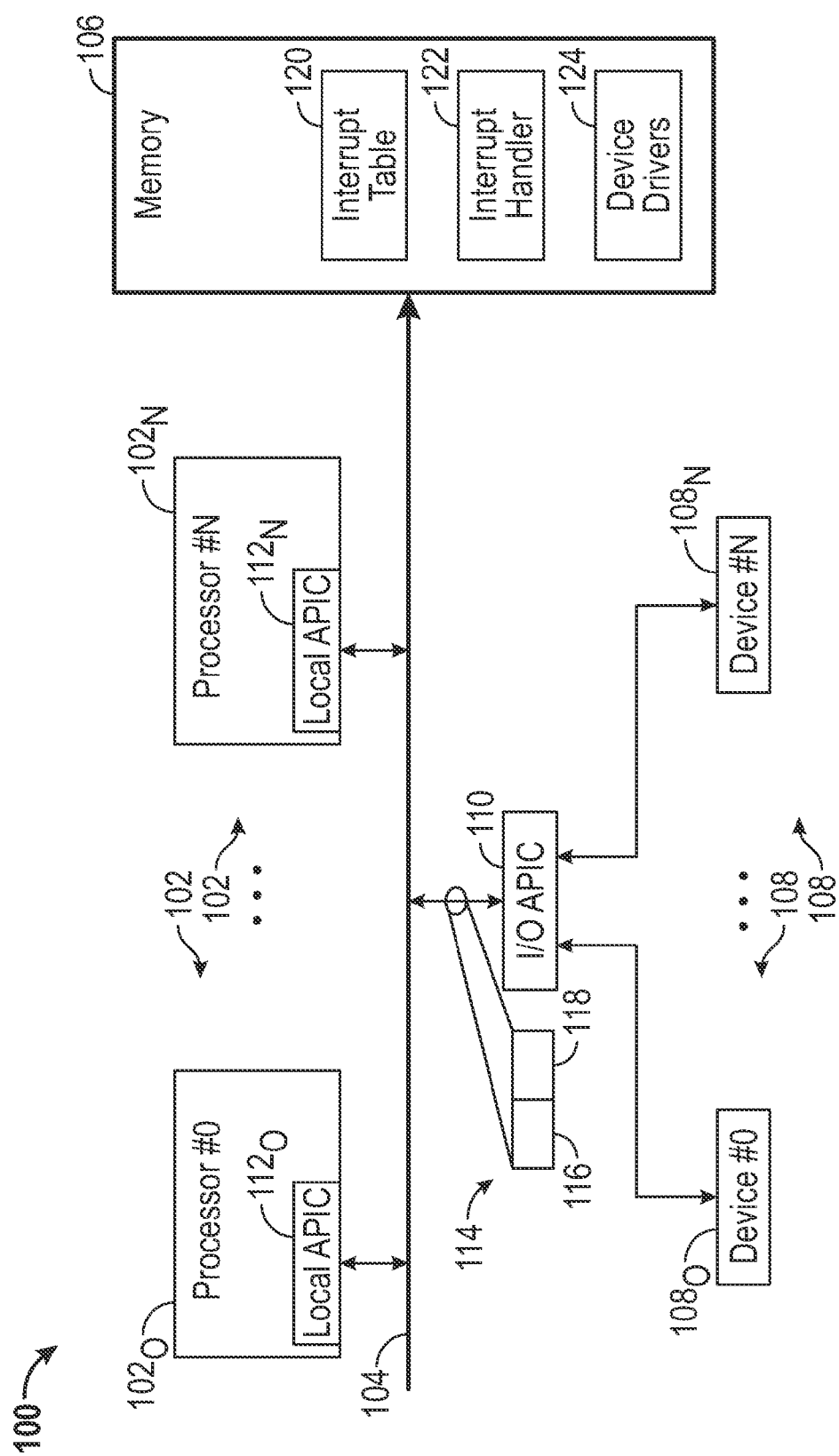
FIG. 1 is a simplified exemplary block diagram conventional computer system.

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. Moreover, as used herein, the word "processor" encompasses any type of information or data processor, including, without limitation, Internet access processors, Intranet access processors, personal data processors, military data processors, financial data processors, navigational processors, voice processors, music processors, video processors or any multimedia processors. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular processor microarchitecture.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to processor architecture and other functional aspects of a processor system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-3 are merely illustrative and may not be drawn to scale.

Figure 2:
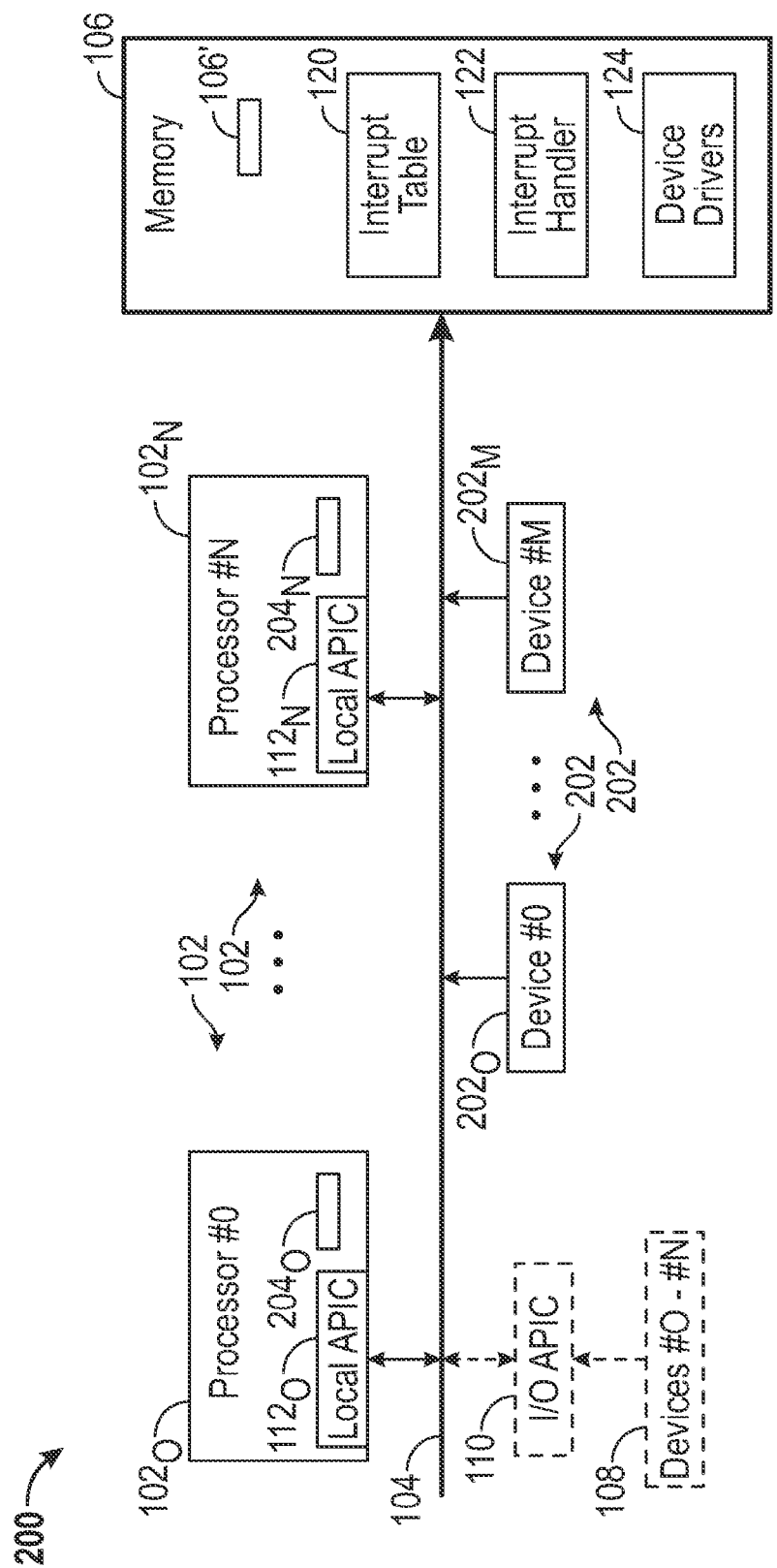
FIG. 2 is a simplified exemplary block diagram of a computer system suitable for use with exemplary embodiments of the present disclosure.

Referring now to FIG. 1, a simplified exemplary block diagram is shown illustrating a conventional computer system 100. Generally, the computer system 100 includes multiple processors $102_0$-$102_N$ (generally 102) each connected to a interconnect 104. The computer system 100 also includes a system memory 106, which may be any type of suitable memory. This would include the various types of dynamic random access memory (DRAM) such as SDRAM and/or the various types of static RAM (SRAM). Also coupled to the interconnect 104 are a plurality of peripheral devices $108_0$-$108_N$ (generally 108) via an input-output advanced programmable interrupt controller (IO APIC) 110. The IO APIC 110 consists of a set of interrupt input signals, an interrupt redirection table, programmable registers, and a message unit for sending and receiving APIC messages over the interconnect 104. During the processing of an interrupt from one of the plurality of peripheral devices 108, the IO APIC 110 selects the corresponding entry in the redirection table and uses the information in that entry to format an interrupt request message to send to a local advanced programmable interrupt controller (Local APIC) which is included in each of the plurality of processors 102. The Local APIC $112_0$-$112_N$ (generally 112) of each processor 102 contains the necessary intelligence to determine when the processor 102 should accept interrupts broadcast on the interconnect 104. The Local APIC 112 also provides local handling of interrupts, nesting and masking of interrupts, and handles all interactions with its local processor 102.

When a peripheral device 108 (for example, peripheral device $108_0$) has an interrupt event, an interrupt request is sent to the IO APIC 110. The IO APIC then sends an interrupt message 114 to the processor(s) 102. The interrupt message 114 includes an address field 116 and a data field 118. The address field contains a predetermined address (for example, FEEX_XXXX$_{hex}$) and the data field 118 contains data representing the interrupt priority, such as the interrupt trigger mode, destination mode, delivery mode and interrupt vector. The Local APIC $112_0$ checks the data within the data field 118 included in the interrupt message 114 to determine if the interrupt priority is higher than the current operational priority of the processor. If the interrupt priority is higher, the Local APIC 112 uses the interrupt vector included in the interrupt message 114 to address the system memory 106 to read information from an interrupt table 120, which includes a pointer to the location of the ISR. The Local APIC 112 also uses the data within the data field 118 included in the interrupt message 114 to update the current interrupt priority in the interrupt table 120. The Local APIC 112 then launches (calls) the ISR that may be located in an interrupt handler 122 stored the system memory 106.

The ISR operates to discover the precise cause of the interrupt (e.g., if several devices share one interrupt) and what must be done to allow the processor ($102_0$ in this example) to handle the interrupt (for example, storing the current thread being executed by the processor). The ISR may then call a device driver associated with the interrupting device, which may be located in a collection of devices drivers 124 (typically, one for each peripheral device 108) stored in the system memory 106. The device driver associated with the interrupting device may then point the processor to the address of the deferred procedure call (DPC) that contains the programming (instructions) that the processor 102 will need to service the interrupt.

While a functional process for handling interrupts, the conventional computer system 100 may experience functionality and performance reductions. First, each IO APIC 110 typically can only handle twenty four interrupts (and each peripheral device 108 may have more than one interrupt line connected to the IO APIC). Thus, multiple IO APICs may be required in the implementation of some computer systems 100. Also, the communication necessary over the interconnect 104 for the ISR or the device drivers to prepare the processor to handle the interrupt may produce severe interrupt handling latencies. In fact, due to the interrupt latency produced, the operating speed of the overall conventional computer system 100 may be significantly affected.

Referring now to FIG. 2, a simplified exemplary block diagram is shown illustrating a computer system 200 suitable for use with exemplary embodiments of the present disclosure. The computer system 200 also includes multiple processors $102_0$-$102_N$ (generally 102) connected to a interconnect 104 and a system memory 106. Optionally, the computer system 200 may also include conventional peripheral devices 108 coupled to the system bus via conventional IO APICs 110. However, according to exemplary embodiments of the present disclosure, the computer system 200 includes a plurality of peripheral devices $202_0$-$202_m$ (generally 202) that operate to process interrupts following a task based message signaled interrupt (Task MSI) method that will be discussed in detail below in connection with FIG. 4.

The Task MSI process overcomes the detriments discussed above in connection with FIG. 1 for conventional computer systems 100. As can be seen in FIG. 2, the number of peripheral devices 202 is not limited by the interrupt capacity of an IO APIC since any number of peripheral devices 202 may be coupled directly to the interconnect 104. Moreover, the Task MSI process significantly reduces interrupt handling latency by not calling the ISR as a first-level interrupt handler, but instead, uses the device driver associated with the interrupting device to prepare and store information that allows a processor to more directly call the DPC to handle the interrupt.

As an example, consider that peripheral device $202_0$ has an interrupt event (such as by a user action). The peripheral device $202_0$ sends a message to invoke its associated device driver, which may be located with the collection of devices drivers 124 stored in the system memory 106. Since each of the plurality of peripheral devices 202 communicates directly with its associated device driver, the format of the interrupt triggering message may vary for each peripheral device manufacturer and need only be a message compatible with the format rules of the interconnect 104. The device driver allocates a portion 106' of the system memory 106 within a memory range allocated for TASK MSI and stores the Task MSI data for later use by the processor 102 that will service the interrupt. In some embodiments, each device driver may request to have a portion of the system memory allocated to TASK MSI assigned to it, however, system memory is typically a premium resource and is allocated as need by the device drivers 124.

Referring now to FIG. 3, the data format 300 for the Task MSI data is illustrated. At the top of the data format 300 is the processor identification (ID) 302, which represents processor logical address (or optionally, the Local APIC 112 ID) of the processor that may service the interrupt. In some embodiments, multiple processor IDs may be specified if more than one processor 102 could handle the interrupt. For example, each bit in the processor ID field 302 could represent one of the plurality of processors 102. In this way, if one of the processors is operating on a higher priority task, another processor may service the interrupt. Also stored in the Task MSI data is the Task MSI priority 304. So long as the stored Task MSI priority level is higher than the current operating priority of a processor 102, the processor will handle the interrupt. Next the thread context 306 is stored in the Task MSI data. The thread context 306 is the thread that the interrupt servicing processor will load after storing its current thread to service the interrupt. Optionally, other data 308 may be stored in some embodiments if additional data is required for servicing the particular interrupt. Finally, the DPC address is stored so that the interrupt servicing processor 102 may jump directly to the DPC call without waiting for the ISR and conventional device driver communication traffic as required in conventional computer systems. In this way, the protracted interrupt latency issue of conventional computer systems is avoided.

Referring again to FIG. 2, once the device driver has stored the Task MSI data in a portion 106' of the system memory 106, the interrupting peripheral device ($202_0$ in this example) issues a memory write to the plurality of processors 102 to service the interrupt. The memory write action serves to trigger those processors 102 identified in the processor ID field (302 in FIG. 3) to determine whether the incoming interrupt request is a Task MSI message, a system message, a system read/write operation or some other message. In some embodiments, the TASK MSI memory write format is FDDX_XXXX$_{hex}$, which specifies the address in the system memory 106 of the allocated portion 106' containing the Task MSI data for the particular interrupt request. When a processor 102 determines the memory write is a Task MSI request, it (or its Local APIC) compares that priority level to the current operating priority of the processor. If the Task MSI priority level is higher, the processor 102 addresses the system memory 106 to retrieve the Task MIS data and stores the current thread being processed. The interrupt servicing processor then updates is priority register $204_0$-$204_N$ (generally 204) to the Task MSI priority level and loads the thread context (306 in FIG. 3) for servicing the Task MSI request. The thread context will cause the processor to jump directly to a call of the DPC needed to service the interrupt, the address of which is provided (310 of FIG. 3) in the Task MSI data.

Thus, conventional ISR processing and its related communication latency is avoided by the Task MSI process provided by exemplary embodiments of the present disclosure.

Figure 5:
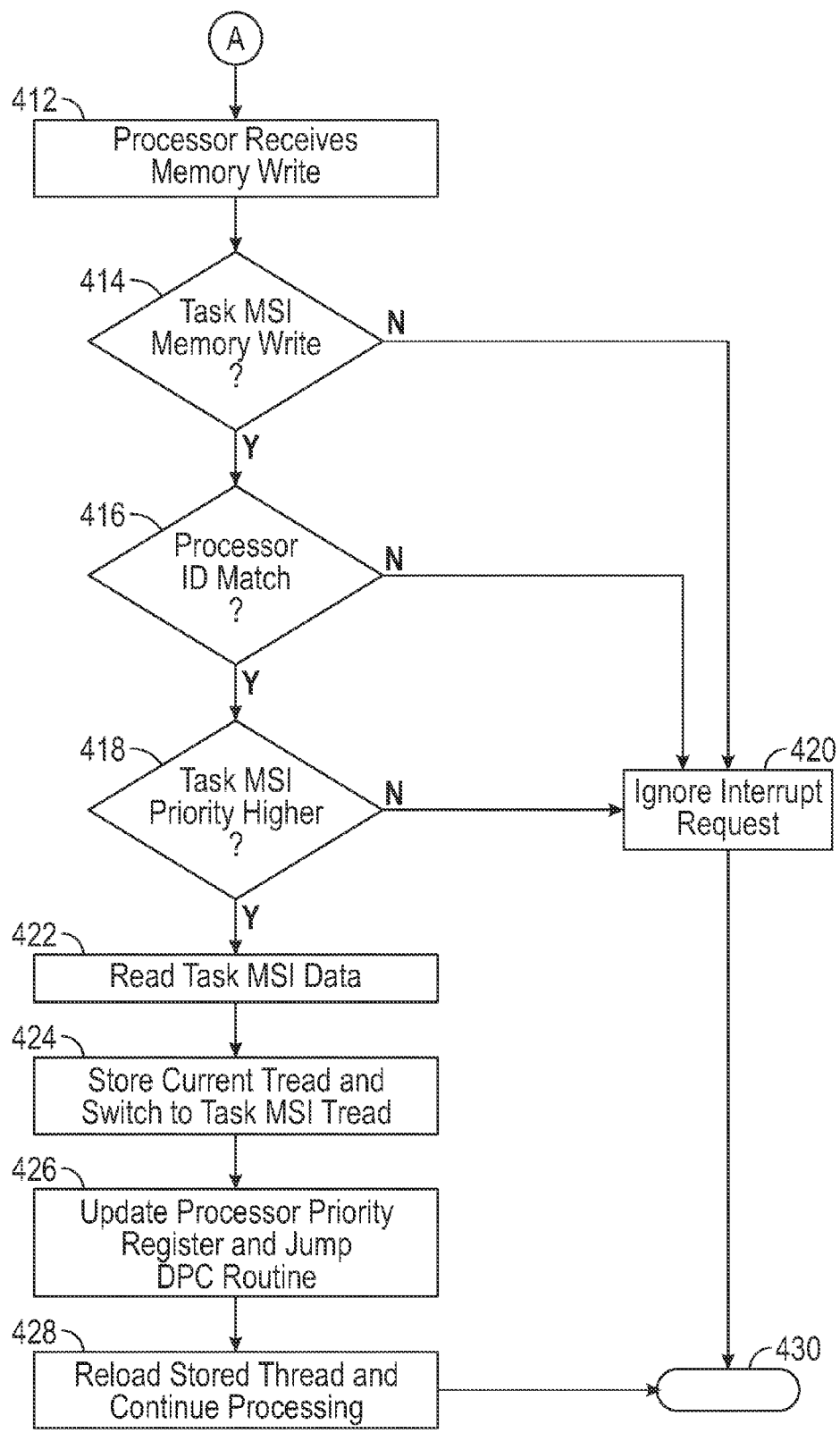

Referring now to FIGS. 4-5, a flow diagram 400 illustrating the Task MSI method according to exemplary embodiments is shown. The routine begins in step 402 where a device driver associated with a peripheral device having an interrupt event receives a request. In step 404, the device driver allocates a portion (106' in FIG. 2) of the system memory 106 and stores (in step 406) the Task MSI data for later use by the processor 102 that will service the interrupt. As noted above, the Task MSI data includes the address (302 in FIG. 3) of the processor(s) that may service the interrupt, the Task MSI priority (304 in FIG. 3), the thread context (306 in FIG. 3) and the address (310 in FIG. 3) of the interrupt servicing instructions (DPC address). Optionally, other data (308 in FIG. 3) may be stored in some embodiments if additional data is required for servicing the particular interrupt.

Next, in step 408, the device driver signals the peripheral device to begin its hardware operation in preparation of having the interrupt serviced by the processor (step 410). The preparatory hardware operation will vary from peripheral device to peripheral device and depending upon the type of interrupt request. When the peripheral device has completed its hardware operation (i.e., it is ready for the processor to service the interrupt), the peripheral device issue a memory write to the processor (step 410), which triggers the processor (202 in FIG. 2) to begin it Task MSI servicing functions.

Continuing in FIG. 5, the processor receives the memory write (step 412) and determines whether the memory write is a Task MSI memory write (decision 414), which indicates that the processor may service the interrupt without calling an ISR. If so, decision 416 determines whether the processor ID information indicates that the particular processor may service the interrupt (for example, a ID match or some other indicator). If the particular processor may service the interrupt, decision 418 determines whether the Task MSI priority is higher than the current operational priority of the processor. If not, or upon a negative determination of decisions 414 or 416, the interrupt request is ignored by that processor (step 420) and the routine end (step 43), unless another processor may service the request if multiple processors were identified in the processor ID (302 in FIG. 3) field of the Task MSI data. Conversely, if the Task MSI priority is higher, the routine proceeds to step 422 where the Task MSI data is read from the system memory. In step 424 the current thread is stored (to be recalled after the interrupt is serviced) and the process switches to process the thread context (306 in FIG. 3). The processor updates its priority register (204 in FIG. 2) and will jump to the interrupt servicing instructions (DPC) to begin servicing the interrupt (step 426). After servicing the interrupt, the DPC concludes by indicating to the processor (such as by setting or clearing a flag) that the processor may resume the operation that it was executing prior to servicing the interrupt. To do this, the thread stored in step 424 is reloaded into the processor and its processing continues step 428).

A software program embodied on computer-readable media is also contemplated. In one embodiment, the software program includes the device driver supporting Task MSI operation. A first group of instructions is configured to allocate a portion of system memory. A second group of instructions is configured to store the processor ID information. A third group of instructions is configured store the Task MSI priority. A fourth group of instructions is configured to store a thread context for a processor switch to. Finally, a fifth group of instructions is configured to store address of interrupt service instructions (DPC) for the processor to service the interrupt.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure, it being understood that various changes may be made in the function and arrangement of elements described in an exemplary embodiment without departing from the scope of the disclosure as set forth in the appended claims and their legal equivalents.

What is claimed is:

1. A method for servicing interrupts in a computer system having a memory and a plurality of processors coupled to one or more peripheral devices, comprising:
   receiving an interrupt request by a device driver within the computer system;
   storing, by the device driver, interrupt data in a portion of the memory, the interrupt data comprising:
   an identification of at least one processor of the plurality of processors capable of servicing the interrupt request;
   a priority of the interrupt request;
   a thread context; and
   an address for instructions to service the interrupt request;
   issuing, by the peripheral device, a memory write to the plurality of processors;
   storing, by the at least one processor, a current thread and switching to the thread context when the priority of the interrupt request is higher than an operational priority of the at least one processor; and
   using the address to access the instructions to service the interrupt request.

2. The method of claim 1, which includes allocating, by the device driver, the portion of the memory for storing the interrupt data.

3. The method of claim 1, which includes the peripheral device performing hardware operations prior to issuing the memory write to the plurality of processors.

4. The method of claim 1, which includes determining, by the at least one processor, whether the memory write facilitates servicing the interrupt request without calling an interrupt service routine.

5. The method of claim 1, which includes updating, by the processor, a priority register to the priority of the interrupt request before switching to the thread context.

6. The method of claim 1, which include reading the interrupt data from the memory.

7. A computer system, comprising:
   an interconnect;
   a plurality of processors coupled to the interconnect;
   one or more peripheral devices coupled to the interconnect;
   a memory coupled to the interconnect;
   a device driver stored in the memory associated with each of the one or more peripheral devices, the device driver responsive to an interrupt request to store in the memory:
   an identification of at least one processor of the plurality of processors capable of servicing the interrupt request;
   a priority of the interrupt request;
   a thread context; and
   an address for instructions to service the interrupt request;
   wherein, the associated peripheral device issues a memory write to the plurality of processors; and
   wherein the at least one processor of the plurality of processors capable of servicing the interrupt request responds to the memory write to switch to the thread context and process the instructions to service the interrupt request.

8. The computer system of claim 7, wherein the device driver allocates a portion of the memory for storing the interrupt data.

9. The computer system of claim 7, wherein the device driver instructs the peripheral device to perform hardware operations prior to issuing the memory write to the plurality of processors.

10. The computer system of claim 7, wherein the at least one processor determines whether the memory write facilitates servicing the interrupt request without calling an interrupt service routine.

11. The computer system of claim 7, wherein the at least one processor updates a priority register to the priority of the interrupt request before switching to the thread context.

12. The computer system of claim 11, wherein the at least one processor stores a current thread before switching to the thread context.

13. The computer system of claim 7, further comprising: at least one input-output advanced programmable interrupt controller (JO APIC) coupled to the system bus;
   one or more second peripheral devices coupled to the IO APIC.

14. A method for servicing interrupts in a computer system having a memory and a plurality of processors coupled to one or more peripheral devices, comprising:
   receiving an interrupt request by a device driver within the computer system; and
   storing, by the device driver, interrupt data in a portion of the memory, the interrupt data comprising:
   an identification of at least one processor of the plurality of processors capable of servicing the interrupt request;
   a priority of the interrupt request;
   a thread context; and
   an address for instructions to service the interrupt request;
   whereby, the device driver causes the associated peripheral device to prepare for the at least one processor to service the interrupt and issue a memory write to the plurality of processors when the associated peripheral device to prepared for the at least one processor to service the interrupt.

15. The method of claim 14, which includes allocating, by the device driver, a portion of the memory for storing the interrupt data.

16. The method of claim 14, which includes determining, by the processor, whether the memory write facilitates servicing the interrupt request without calling an interrupt service routine.

17. The method of claim 14, which includes updating, by the processor, a priority register to the priority of the interrupt request before switching to the thread context.

18. The method of claim 14, which includes reading the interrupt data from the memory.

19. A software program embodied on computer-readable media containing instructions that support servicing an interrupt in a computer system having a memory and a plurality of processors coupled to one or more peripheral devices, comprising:

a first plurality of instructions configured to store identification data for at least one processor capable of servicing an interrupt request from a peripheral device;

a second plurality of instructions configured to store a priority level for the interrupt request;

a third plurality of instructions configured to store a thread context for the at least one processor; and a fourth plurality of instructions configured to store an address for interrupt servicing instructions for the at least one processor.

20. The software program of claim 19, further comprising a fifth plurality of instructions configured to allocate a portion of the memory for storing the first, second, third and fourth plurality of instructions.

* * * * *